US008590905B2

(12) United States Patent
Furusawa et al.

(10) Patent No.: US 8,590,905 B2

(45) **Date of Patent: *Nov. 26, 2013**

(54) CHUCK MECHANISM OF STRIKING TOOL

(75) Inventors: Masanori Furusawa, Anjo (JP); Yoshihiro Kasuya, Anjo (JP)

(73) Assignee: Makita Corporation, Anjo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 13/441,112

(22) Filed: Apr. 6, 2012

(65) Prior Publication Data

US 2012/0193879 A1 Aug. 2, 2012

Related U.S. Application Data

(63) Continuation of application No. 12/010,629, filed on Jan. 28, 2008, now Pat. No. 8,172,235.

(30) Foreign Application Priority Data

Feb. 16, 2007 (JP) ................................ 2007-036907

(51) Int. Cl.
*B23B 31/107* (2006.01)
*B25D 17/08* (2006.01)

(52) U.S. Cl.
USPC .............. 279/19.4; 279/19; 279/19.6; 279/22

(58) Field of Classification Search
USPC ................ 279/19, 19.4, 19.6, 22, 75, 82, 905
See application file for complete search history.

(56) References Cited

U.S. PATENT DOCUMENTS 5,016,892 A * 5/1991 Lafforgue et al. .............. 279/82
5,199,833 A * 4/1993 Fehrle et al. .............. 408/239 R
5,340,245 A * 8/1994 Bloechle et al. .............. 408/226
5,601,388 A * 2/1997 Lauterwald ............... 408/239 R
5,709,391 A * 1/1998 Arakawa et al. ............. 279/19.4
6,651,990 B2 * 11/2003 Higasi et al. ................. 279/19.4
6,669,206 B2 * 12/2003 Hanke .......................... 279/19.4
6,732,815 B2 * 5/2004 Hanke et al. .................. 173/201
6,854,740 B2 * 2/2005 Baumann et al. ............ 279/19.6
6,948,571 B2 * 9/2005 Hanke et al. .................. 173/201
7,997,837 B2 * 8/2011 Furusawa et al. ......... 408/239 R
8,172,235 B2 * 5/2012 Furusawa et al. ............ 279/19.4

(Continued)

FOREIGN PATENT DOCUMENTS

DE 44 05 697 A1 8/1995
DE 199 50 393 A1 5/2001

(Continued)

OTHER PUBLICATIONS

Aug. 2, 2011 Office Action issued Japanese Patent Application No. 2007-036907 (with translation).

(Continued)

*Primary Examiner* — Eric A Gates
*Assistant Examiner* — Bayan Salone
(74) *Attorney, Agent, or Firm* — Oliff & Berridge, PLC

(57) ABSTRACT

Connection of a bit with two balls is enabled while high operability of attachment and detachment of the bit is maintained. A pressing ring 23 is held at the advance position together with an operation sleeve 22 by a guide washer 24 forced by a coil spring 25. When the rear end of the bit is inserted into a tool holder 8, the balls 27, 27 that are rolled rearward by the contact of the rear end of the bit are pushed in between the pressing ring 23 and the guide washer 24 in order, and the balls 27, 27 can be retracted from the tool holder 8 in the state where the pressing ring 23 is held at the advance position by the tilt of the guide washer 24.

12 Claims, 4 Drawing Sheets

(56) References Cited

U.S. PATENT DOCUMENTS

| | | | | |
|---|---|---|---|---|
| 2003/0025281 | A1 * | 2/2003 | Higasi et al. | 279/19.4 |
| 2007/0024013 | A1 * | 2/2007 | Hauptmann et al. | 279/75 |
| 2008/0197583 | A1 * | 8/2008 | Furusawa et al. | 279/30 |
| 2010/0176561 | A1 * | 7/2010 | Braun et al. | 279/46.7 |

FOREIGN PATENT DOCUMENTS

| | | |
|---|---|---|
| GB | 2 096 045 A | 10/1982 |
| JP | B2 03-043003 | 7/1991 |
| JP | A-2002-370180 | 12/2002 |
| JP | A-2007-030161 | 2/2007 |
| WO | WO 2008/155152 A2 | 12/2008 |

OTHER PUBLICATIONS

Dec. 18, 2009 Search Report issued in European Patent Application No. 08002576.0.

Jan. 10, 2013 Search Report issued in European Patent Application No. 12195854.0.

* cited by examiner

CHUCK MECHANISM OF STRIKING TOOL

This is a Continuation of application Ser. No. 12/010,629 filed Jan. 28, 2008, which claims the benefit of Japanese Patent Application Number 2007-036907 filed on Feb. 16, 2007, the entirety of which is incorporated by reference.

BACKGROUND OF THE INVENTION

1. Field of the Invention

The present invention relates to a chuck mechanism provided at a tip end of a striking tool, such as a hammer or a hammer drill, where a bit is insertedly mounted.

2. Description of the Related Art

In a striking tool such as a hammer or a hammer drill, a chuck mechanism for insertedly mounting a bit is provided at the tip end of a housing. As shown in FIG. 4 of Japanese Examined Patent Application Publication No. 3-43003, a conventional chuck mechanism includes a ball movable in a radial direction in a through hole formed in a cylindrical tool holder in which a bit is inserted, and further externally mounts a sliding sleeve for operation, which houses a support ring for pressing the ball to the axis side, a thin-sheet ring which is in contact with the ball and the sliding sleeve, and a coil spring which forces the thin-sheet ring frontward, at the periphery of the tool holder. In normal state of the chuck mechanism, the ball is pressed to the axis side in front of the through hole by the support ring under the force of the coil spring, projects into the tool holder and fits in a groove formed in the axial direction at the outer periphery of the bit, so that the bit does not come off. When the sliding sleeve is slid rearward and thereby the support ring is retracted rearward from the outer periphery side of the ball, the ball moves to the outer periphery side to remove the bit.

In the above-described chuck mechanism, when the bit is inserted into the tool holder, the ball rolled rearward in the through hole by the rear end of the bit. Then the ball is pushed in between the support ring and the thin-sheet ring, by which the ball is moved to the outer periphery side of the tool holder. When the bit is completely inserted, the ball which has been advanced under the force of the coil spring is projected again to the axis side by press of the support ring, and fits in the groove. Thereby, the bit can be prevented from coming off by the ball movement with only insertion of the bit and it is not necessary to retract the sliding sleeve. Therefore, the operability of attachment and detachment of bit is improved. However, only one ball can be used in terms of the construction because if two balls are used where the bit is inserted in the tool being directed upward, the support ring retracts as well when the thin-sheet ring retracts due to the insertion of bit, so that the ball cannot be retracted. For this reason, a force of the ball to prevent the bit from coming off becomes relatively small. Therefore, the ball may come out from the groove of the bit by impact at the time of striking, or the bit or ball may be damaged, which leads to the degradation of reliability and durability.

SUMMARY OF THE INVENTION

Accordingly, an object of the present invention is to provide a chuck mechanism of a striking tool, which enables a bit to be connected by two balls while high operability of attachment and detachment of the bit is maintained, and reliability and durability can be improved by enhancement of force for preventing the bit from coming off.

To achieve the above object, a first aspect of the present invention provides a chuck mechanism of a striking tool, including a cylindrical tool holder in which the rear end of a bit is inserted from the front; two balls which are rollable through a predetermined distance in the axial direction of the tool holder in a pair of accommodation holes provided in the tool holder and are capable of coming out to the axis side of the tool holder; a contacting member which is externally mounted on the tool holder to force the balls to the front positions of the accommodating holes by a forcing means; and an operation sleeve which is externally mounted on the tool holder so as to be movable back and forth between a lock position, at which a pressing ring provided at the inner periphery is located on the outside of the balls at the front positions to project the balls to the axis side of the tool holder, and an unlock position, at which the pressing ring retracts from the outside of the balls at the front positions to allow the balls to retract from the tool holder, and a holding means for holding the pressing ring and the operation sleeve at the advance position, wherein when the rear end of the bit is inserted into the tool holder, the balls that are rolled rearward by the contact of the rear end of the bit are pushed in between the pressing ring and the contacting member to be retracted from the tool holder, in a state where the pressing ring is held at the advance position by the holding means.

A second aspect of the present invention is the chuck mechanism of a striking tool according to the first aspect, wherein the holding means is formed so that contacting portions with the balls shift from each other in the front and rear direction; and when the balls are forced to the front positions by the forcing means, the holding means serves as a contact member to contact and force the pressing ring to the advance position, and when the rear end of the bit comes into contact and roll the balls rearward, the contacting member first pushes one ball in between the pressing ring and the contacting member to make the contact member tilt, by which the contacting state with the pressing ring is maintained and the advance position of the pressing ring is held.

A third aspect of the present invention is the chuck mechanism of a striking toll according to the first aspect, wherein the holding means is made as a second forcing means for forcing the pressing ring forward.

According to the first aspect of the invention, even in the case where the striking tool is directed upward, a bit can be assuredly connected to the tool holder by the two balls. Therefore, force for preventing the bit from coming off is enhanced while high operability of attachment and detachment of the bit is maintained, so that the reliability and durability can be improved.

According to the second aspect of the present invention, in addition to the advantage of the first aspect, the holding means can be configured rationally by a simple design change of the contacting member utilizing the existing forcing means.

According to the third aspect of the present invention, in addition to the advantage of the first aspect, the holding means can be configured easily by adding of the second forcing means.

DETAILED DESCRIPTION OF THE PREFERRED EMBODIMENT

An embodiment of the present invention will now be described by reference to the accompanying drawings.

Figure 1:
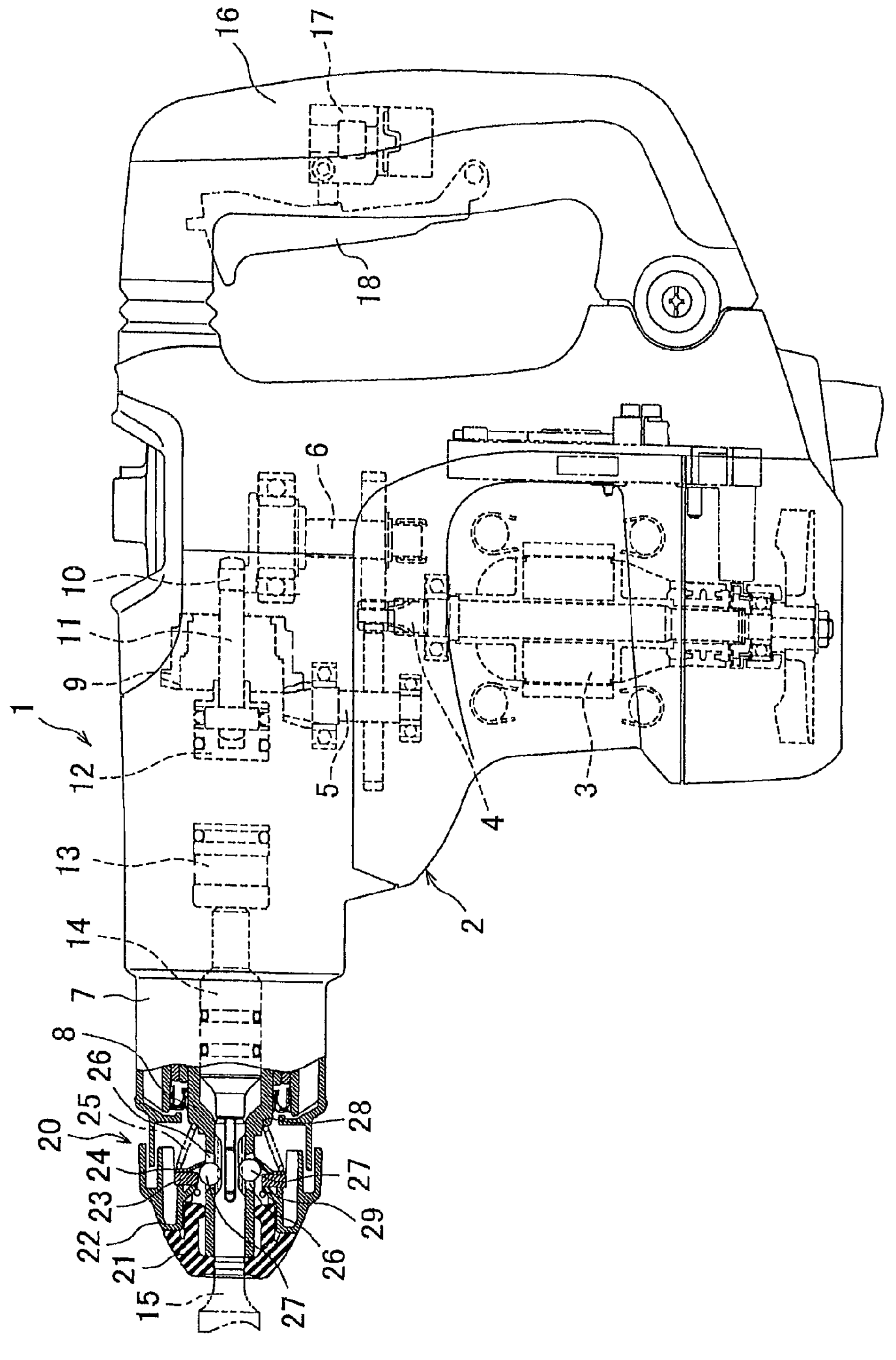
FIG. 1 is a general view of a hammer drill provided with a chuck mechanism in accordance with an embodiment of the present invention.

FIG. 1 is a general view of a hammer drill, which is one example of a striking tool. The hammer drill 1 is configured so that a motor 3 is housed at a lower part in a housing 2 with an output shaft 4 thereof being directed upward. Above the motor 3, a gear shaft 5 and a crankshaft 6, to which the rotation of the output shaft 4 is transmitted, are pivotally provided in parallel with each other. In FIG. 1, reference numeral 7 denotes a cylindrical barrel part projecting forward (to the left-hand side in FIG. 1) at an upper part of the housing 2. In the barrel part 7, a tool holder 8 is provided so as to be rotatable. At the rear of the tool holder 8, a cylinder, not shown, is connected coaxially and integrally, and a bevel gear 9 externally mounted integrally with the outer periphery of the cylinder meshes with the gear shaft 5 so that the rotation of the output shaft 4 can be transmitted.

On the other hand, in the cylinder, a piston 12 connected to an eccentric pin 10 projectingly provided above the crankshaft 6 by a connecting rod 11 is inserted so that the rotation of the crankshaft 6 can be converted into the reciprocating motion of the piston 12. In front of the piston 12, a striker 13 that moves in association with the movement of the piston 12 via an air chamber is housed. By the reciprocating motion of the striker 13, an impact bolt 14 housed at the rear of the tool holder 8 is struck, by which the rear end of a bit 15 inserted in the tool holder 8 can be struck indirectly. Reference numeral 16 denotes a handle formed at the rear of the housing 2. In the handle 16, a switch 17 to drive the motor 3 by being turned on by the pushing-in operation of a switch lever 18 is housed.

At the front end of the barrel part 7, a chuck mechanism 20 is provided. As shown in FIG. 2, this chuck mechanism 20 is formed so that an operation sleeve 22, a pressing ring 23, a guide washer 24 serving as a contacting member and a holding means, and a coil spring 25 are externally mounted on the tool holder 8 between a rubber cap 21 fixed at the front end of the tool holder 8 and the front end of the barrel part 7. Further, in the tool holder 8, elongated accommodation holes 26, 26 extending in the axial direction are formed at positions that are point symmetrical with respect to the center of the axis, and in the accommodation holes 26, 26, balls 27, 27 are accommodated so as to be rollable in the front and rear direction and capable of coming out to the axis side of the tool holder 8.

The operation sleeve 22 is provided so as to be movable back and forth between the rubber cap 21 and the front end of the barrel part 7, and the pressing ring 23 and the guide washer 24 are also provided so as to be movable back and forth separately from the operation sleeve 22 on the inside of the operation sleeve 22. By the coil spring 25 interposed between the outer peripheral rear surface of the guide washer 24 and a step part 28 of the tool holder 8, the operation sleeve 22 is forced to the advance position at which the operation sleeve 22 comes into contact with the rubber cap 21 in the normal state. The pressing ring 23 and the guide washer 24 are also forced to the advance position at which the pressing ring 23 comes into contact with a stopper part 29 formed at the inner periphery of the operation sleeve 22.

Figure 3:
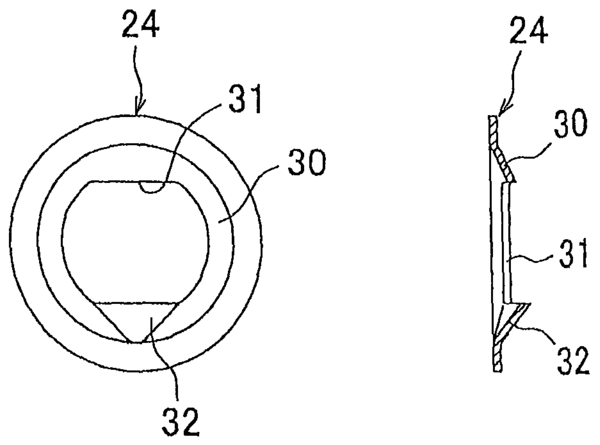
FIG. 3 is explanatory views of a guide washer, the left figure being a front view, and the right figure being a longitudinal sectional view.

As shown in FIG. 3, the guide washer 24 is configured so that the central part thereof consists of a cone-shaped receiving part 30 that retreats toward the center, and in the center of the receiving part 30, a through hole 31 formed with a two-face width that matches the chamfered parts formed in the upper and lower parts of the tool holder 8 is provided, so that the guide washer 24 can be moved back and forth in the axial direction in the state where the rotation thereof with respect to the tool holder 8 is regulated. Further, in the receiving part 30, a retreating part 32 that tilts rearward at an angle larger than the tilt angle on the upper side is concavely provided on the lower side of the through hole 31, so that the lower ball 27, 27 can engage with the retreating part 32. That is to say, the contact portions of the upper and lower balls 27 sift from each other in the front and rear direction.

Therefore, in the state where the guide washer 24 is at the advance position by the force of the coil spring 25, each of the balls 27, 27 moves to the front position of the accommodation hole 26 by the receiving part 30. At the same time, the balls roll to a lock position at which a part of the balls is projected to the axis side of the tool holder 8 by the pressing ring 23 positioned on the outside thereof. At this time, the lower ball 27 has play capable of moving slightly rearward as compared with the upper ball because the lower ball 27 engages with the retreating part 32. Despite the play, the projection into the tool holder 8 is maintained, since the interference with the pressing ring 23 is unchanged.

On the other hand, in the rear end of the outer surface of the bit 15, a pair of concave grooves 33, 33 with which the balls 27, 27 projecting into the tool holder 8 can engage are concavely provided so as to have a predetermined length in the axial direction. Further, at positions 90° shifting from the concave grooves 33, 33 in the circumferential direction, the grooves 35, 35 for determining the positions in which the protrusions 34, 34 projectingly provided in the tool holder 8 fit and for connecting the bit to the tool holder 8 in the rotation direction are concavely provided so as to have a predetermined length from the rear end to the front side.

In the chuck mechanism 20 configured as described above, even in the state in which the bit 15 is not mounted, the balls 27, 27 are located at the lock positions at which the balls are projected to the center side of the tool holder 8 by the receiving part 30 and the pressing ring 23, since the operation sleeve 22, the pressing ring 23, and the guide washer 24 are located at the advance positions by the force of the coil spring 25, as described above.

Figure 2C:
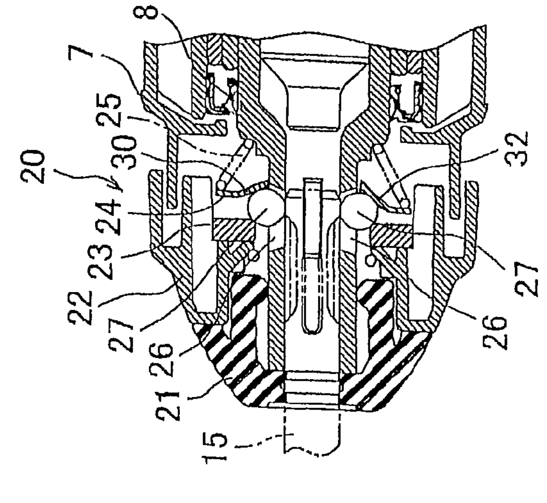
FIGS. 2A to 2C are explanatory views showing the operation of the chuck mechanism shown in FIG. 1 at the time when a bit is inserted.
Figure 2B:
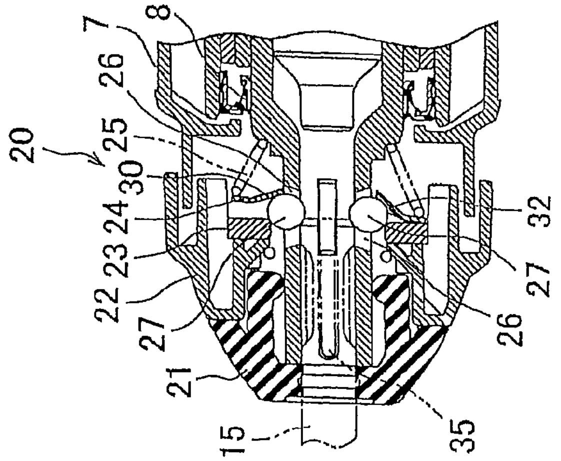
Figure 2A:
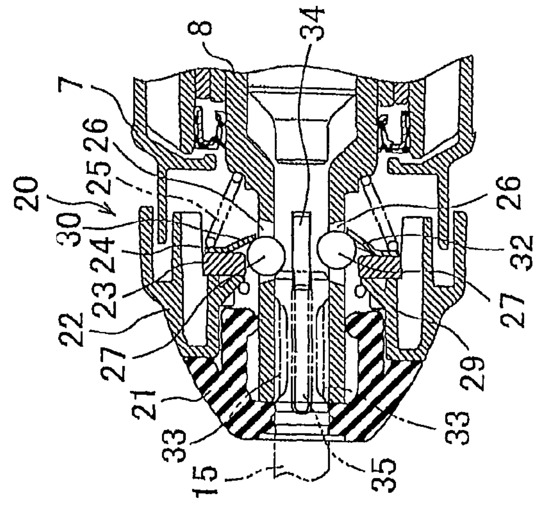

When the bit 15 is inserted into the tool holder 8 from the above-described state, as shown in FIG. 2A, the balls 27, 27 that come into contact with the rear end of the bit 15 are pushed in between the pressing ring 23 and the receiving part 30 of the guide washer 24 while the balls are rolling rearward in the accommodation holes 26, which allows the insertion of the bit 15. However, since the lower ball 27 is moved slightly rearward as compared with the upper ball 27 by the retreating part 32, as shown in FIG. 2(B), the upper ball 27 is first pushed in between the pressing ring 23 and the receiving part 30, by which the guide washer 24 tilts. Therefore, the force of the coil spring 25 is still transmitted to the pressing ring 23 and the operation sleeve 22 via the lower part of the guide washer 24, so that the pressing ring 23 can be prevented from dropping downward and thereby inhibiting the pushing-in of the ball 27, even if the hammer drill 1 is directed upward.

When the bit 15 is retreated farther from here, as shown in FIG. 2C, the upper ball 27 is completely pushed in between the pressing ring 23 and the receiving part 30 and retracts from the tool holder 8. At the same time, the lower ball 27 is also pushed in between the pressing ring 23 and the receiving part 30, and retracts from the tool holder 8 and moves to an unlock position. Therefore, the guide washer 24 separates completely from the pressing ring 23, however, the advance positions of the operation sleeve 22 and the pressing ring 23 are unchanged, since the forcing force of the coil spring 25 is transmitted to the pressing ring 23 via the balls 27, 27.

When the concave grooves 33, 33 at the outer periphery of the bit 15 reach the positions of the balls 27, 27 as shown in FIG. 1, the upper and lower balls 27, 27 are rolled again to the front positions of the accommodation holes 26 via the guide washer 24 by the force of the coil spring 25, and are projected to the axis side of the tool holder 8 by the pressing ring 23 to engage with the concave grooves 33, 33. Therefore, the bit 15 is integrated with the tool holder 8 via the balls 27, 27 in the rotation direction, and is connected so as to be movable back and forth in the axial direction with a stroke where the balls 27, 27 come into contact with the front and rear ends of the concave grooves 33, 33.

Figure 4:
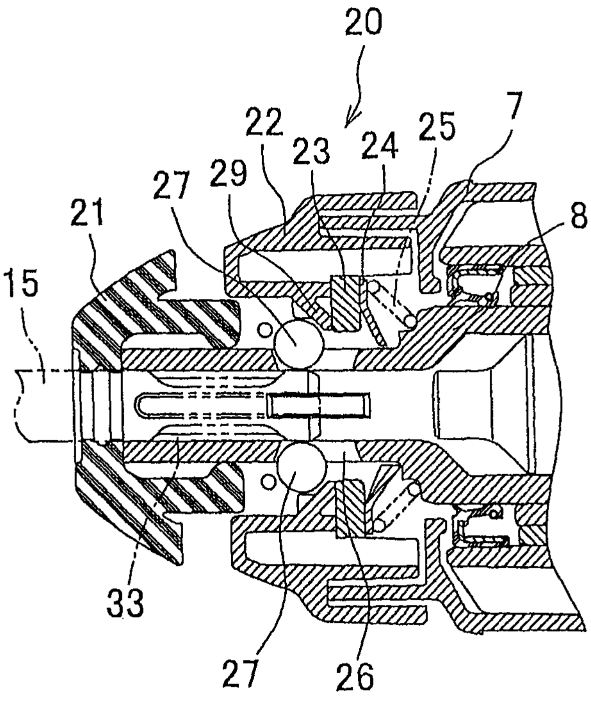
FIG. 4 is an explanatory view showing the operation of the chuck mechanism shown in FIG. 1 at the time when a bit is removed.

On the other hand, in the case where the bit 15 is removed, when the operation sleeve 22 is retreated against the force of the coil spring 25, as shown in FIG. 4, the pressing ring 23 retracts from the outside of the balls 27, 27 so that the balls 27, 27 are allowed to move outwards. Therefore, if the bit 15 is pulled to the front, the balls 27, 27 in contact with the rear ends of the concave grooves 33, 33 move to the outside in front of the stopper part 29 and retract to the unlock position. Thereby, the bit 15 can be drawn out of the tool holder 8.

As described above, the chuck mechanism 20 of the above-described embodiment has the holding means, such as the guide washer 24, for holding the pressing ring 23 at the advance position together with the operation sleeve 22 is provided. Thereby, when the rear end of the bit 15 is inserted into the tool holder 8, in the state where the pressing ring 23 is held at the advance position by the guide washer 24, the balls 27, 27 rolling rearward due to the contact of the rear end of the bit are pushed in between the pressing ring 23 and the guide washer 24. Then, the balls are retracted from the tool holder 8, whereby the bit 15 can be connected assuredly to the tool holder 8 by the two balls 27, 27 even in the case where the hammer drill 1 is directed upward. Therefore, the force for preventing the bit 15 from coming off is enhanced while high operability of attachment and detachment of the bit 15 is maintained. Thus, the reliability and durability can be improved.

Further, the holding means is configured so that the contacting portions with the balls 27, 27 shift from each other in the front and rear direction and when the balls 27, 27 are forced to be at the front positions by the coil spring 25, the guide washer 24 comes into contact with the pressing ring 23 and forces the pressing ring 23 to be at the advance position. Therefore, when the balls 27, 27 are rolled rearward by the contact with the rear end of the bit, the guide washer 24 first pushes one ball 27 in between the pressing ring 23 and the guide washer 24 tilts, by which the state of being in contact with the pressing ring 23 is maintained and the advance position thereof is held. In this manner, the holding means can be configured rationally by a simple design change of the guide washer 24 utilizing the existing coil spring 25.

In the above-described embodiment, the pressing ring is separate from the operation sleeve, and is externally mounted on the tool holder. However, the pressing ring may be connected integrally to the operation sleeve by press fit etc. Alternatively, a ring-shaped part corresponding to the pressing ring may be projectingly provided on the operation sleeve.

Figure 5:
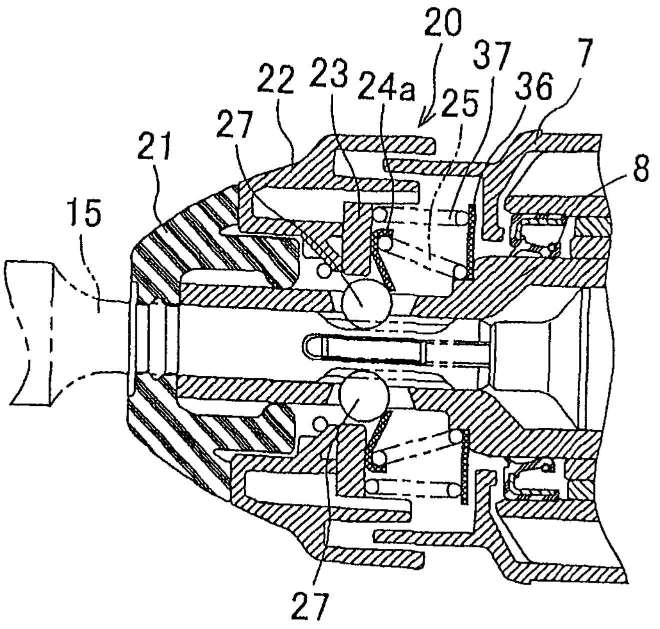
FIG. 5 is an explanatory view showing a modification of the chuck mechanism shown in FIG. 1.

The configuration of the guide washer that serves as a holding means may be changed arbitrarily: for example, a retreating part thereof may be provided on the upper side reversely to the above-described embodiment to reverse the tilt. Needless to say, the holding means is not limited to the guide washer. For example, as shown in FIG. 5, the holding means may be such that a guide washer 24*a* is of an ordinary cone shape and is used only for the forcing of the balls 27, 27 together with the coil spring 25, while a flat washer 36 is externally mounted in the step part 28 of the tool holder 8, and a coil spring 37 having a diameter larger than that of the coil spring 25, which is a second forcing means, is interposed between the pressing ring 23 and the flat washer 36, by which the pressing ring 23 is forced directly to the advance position by the coil spring 37. Even when the coil spring 37 for forcing the pressing ring 23 to the front is used as the holding means as described above, the holding means can be configured easily by the addition of the coil spring 37.

Further, in the above-described embodiment, the hammer drill is typically shown as a striking tool. However, the present invention can be applied to any other kinds of striking tool such as a hammer if the tool is configured so that the bit is connected by the balls provided in the tool holder.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every disclose every possible intermediate value or intermediate entity for the purpose of original disclosure as well as for the purpose of restricting the claimed invention, in particular as limits of value ranges.

What is claimed is:

1. A chuck mechanism of a striking tool, comprising:

a cylindrical tool holder in which a rear end of a bit is inserted from a front end of the holder;

two balls configured to roll through a predetermined distance in an axial direction of the tool holder in a pair of accommodation holes provided in the tool holder and are configured to move through a predetermined distance in a radial direction of the tool holder;

a contacting member which is externally mounted on the tool holder to force the balls to respective front positions of the accommodation holes by at least one biasing device;

an operation sleeve which is externally mounted on the tool holder so as to be movable back and forth between a lock position, in which a pressing ring provided at an inner periphery of which is located on an outside of the balls at the front positions to project the balls radially inwardly from the tool holder, and an unlock position, in which the pressing ring retracts rearward from the outside of the balls at the front positions to allow the balls to retract radially outwardly from the tool holder; and a holding device configured to hold the pressing ring and the operation sleeve at an advance position, wherein when the rear end of the bit is inserted into the tool holder, each ball is rolled rearward by contact of the rear end of the bit and pushed in between the pressing ring and the contacting member and retracted radially outwardly from the tool holder, in a state where the pressing ring is held at the advance position by the holding device, wherein the contacting member is configured to allow one of the two balls to retract radially outwardly from the toolholder before the other of the two balls in response to the rear end of the bit coming into contact with the balls and rolling the two balls rearward.

2. The chuck mechanism of a striking tool according to claim 1, wherein the holding device is formed so that portions of the holding device contacting the balls shift with respect to each other in the front and rear direction; and when the balls are forced to the front position by the at least one biasing device, the holding device serves as a contacting member to contact and force to the advance position with the pressing ring; and when the rear end of the bit comes into contact with the balls and rolls the balls rearward, the contacting member first pushes one ball in between the pressing ring and the contacting member to make the contact member tilt, in a state of contact with the pressing ring.

3. The chuck mechanism of a striking tool according to claim 2, wherein the contact member is a guide washer which is externally provided on the tool holder and has a cone-shaped receiving part that retreats rearward toward the center with an angle, wherein the receiving part has a retreating part which tilts rearward toward the center at an angle larger than the tilt angle of the receiving part, so that the portions of the holding device contacting each ball shift with respect to each other in front and rear direction.

4. The chuck mechanism of a striking tool according to claim 3, wherein the receiving part of the guide washer includes a through hole at the center thereof, which has a two-face width matching chamfered parts formed in respective upper and lower parts of the tool holder, such that the rotation of the guide washer is regulated.

5. The chuck mechanism of a striking tool according to claim 3, wherein the biasing device is a coil spring interposed between an outer peripheral rear surface of the guide washer and a step part of the tool holder.

6. The chuck mechanism of a striking tool according to claim 3, wherein the operation sleeve is forced to the advance position by the coil spring to contact with a rubber cap provided at the front end of the tool holder, and wherein the pressing ring and the guide washer are forced to the advance position where the pressing ring contacts with a stopper part at the inner periphery of the operation sleeve.

7. The chuck mechanism of a striking tool according to claim 1, wherein the accommodation holes are provided at respective positions that are point symmetrical with respect to a center axis of the tool holder.

8. The chuck mechanism of a striking tool according to claim 1, wherein a pair of concave grooves with a predetermined length in the axial direction, with which the balls projecting into the tool holder can engage, are provided in a rear end outer surface of the bit, and grooves for positioning a protrusion projectingly provided in the tool holder and for connecting the bit in the rotation direction are provided at positions shifted 90° in a about a center axis from the concave grooves.

9. The chuck mechanism of a striking tool according to claim 1, wherein the holding device is a second biasing device configured to force the pressing ring forward.

10. The chuck mechanism of a striking tool according to claim 9, wherein the second biasing device is a coil spring interposed between the pressing ring and a flat washer which is externally provided at the step part of the tool holder.

11. The chuck mechanism of a striking tool according to claim 1, wherein the at least one biasing device consists of two different biasing devices having different elastic properties from each other and configured to support the contacting member in such a manner as to cause the contacting member to tilt in relation to the axial direction.

12. The chuck mechanism of a striking tool according to claim 1, wherein the contacting member is a washer defining a plane and configured with a first inner radial portion that extends at a first angle with respect to the plane, and a second inner radial portion that extends at a second angle with relation to the plane such that the first angle and second angle are not equal.

* * * * *